UNITED STATES PATENT OFFICE.

KARL J. HOLLIDAY, OF GLEN OSBORNE BOROUGH, PENNSYLVANIA, ASSIGNOR TO HOLLIDAY CHEMICAL COMPANY, OF PITTSBURGH, PENNSYLVANIA, A CORPORATION OF PENNSYLVANIA.

SURGICAL DRESSING.

1,264,185.  Specification of Letters Patent.  Patented Apr. 30, 1918.

No Drawing.  Application filed September 25, 1917.  Serial No. 193,066.

*To all whom it may concern:*

Be it known that I, KARL J. HOLLIDAY, a citizen of the United States, and residing in the borough of Glen Osborne, in the county of Allegheny and State of Pennsylvania, have invented or discovered new and useful Improvements in Surgical Dressings, of which the following is a specification.

My invention consists in a new and improved surgical dressing of the type that when in a melted state is painted or sprayed on a burn or other wound to form, when hardened, a protective cover or coating.

The object that I have in view is the production of such a dressing which has a definite melting point within the limits of safe application to the wound; which may be melted and repeatedly remelted without varying its melting point or causing its constituent substances to separate; which will form a strong, elastic and non-cracking covering for the wound, properly adhering but non-irritating and removable without tearing the surface of the wound or sticking to hairs; which may be used as a vehicle for healing drugs, and which, when removed from the wound, will be substantially free from offensive odors.

A number of surgical dressings of this type have been placed on the market and used in hospitals and first aid stations, but none of them have met the above enumerated requirements in a satisfactory manner.

Thus paraffin, either by itself or combined with other substances has been used. But paraffin lacks the necessary physical properties, being too brittle and thus liable to crack and admit air to the wound. It does not adhere properly to the flesh and it is also harsh and irritating. The addition to the paraffin of commercial beeswax is objectionable as the latter contains from 12% to 15% of free acids, chiefly cerotic acid, which is an active irritant. Olive oil has also been mixed with the paraffin, but it also contains free acids, and also, when repeatedly reheated, becomes rancid, owing to the breaking down of the glycerids and the release of additional free acids. Rosin is also composed largely of free acids. Similar objections apply to asphalts, tars and various commercial rubbers, all of which have been suggested as available ingredients to be used with the paraffin. These substances have also the seriously objectionable feature that when removed from the wound they give off a most offensive stench.

My improved surgical dressing, which fully satisfies all the requirements above enumerated, is formed by compounding together paraffin and beeswax, preferably together with a gum, such as a gum of the elemi group, the compound product being free from free acids.

My product has a definite melting point which may be anywhere from 120° to 130° Fahr., preferably about 125° Fahr., and to obtain such a melting point for the compound, the proportion of beeswax to the paraffin varies with the melting point of the paraffin used. Where paraffin of a low melting point is to be used, the proportion of beeswax is increased to raise the definite melting point of the compound, while with paraffin of a high melting point, the proportion of beeswax is decreased.

My formula is therefore substantially as follows, the percentages referring to weight:

Paraffin varies from 95% to 65%.
Beeswax varies from 5% to 35%.
Elemi gum varies from 0.1% to 5%.

Where the proportion of beeswax is increased, as when paraffin of a low melting point is used, the amount of gum is also increased to counteract the leatheriness of the beeswax.

Where paraffin of the melting point of from 124° to 126° Fahr. is used, the following proportions may be used successfully.

Paraffin _____ 84%
Beeswax _____ 15%
Elemi gum _____ 1%

The compounding of these elements together, and the elimination of the free acids may be accomplished by the following method.

I take by weight say twenty pounds of the ingredients in the proportions indicated and by chemical analysis determine the amount of free acids contained therein. I then add to the mixture sufficient sodium hydroxid to neutralize the free acids present. I then boil the mixture in about three gallons of water, stirring it during the boiling operation, until a stable emulsion is produced.

The boiling operation, which usually takes from ten to fifteen minutes, causes the free acids to unite with the caustic to form soaps, leaving the waxes neutral.

I then add sodium chlorid or sodium sulfate, or their equivalents, in sufficient quantity to cause the larger part of the soap to separate from the waxes and to remain in solution while the waxes, glycerids and esters rise to the top. The materials are kept at a high enough temperature to maintain the soaps in solution. I have successfully used for this purpose from four to eight ounces of salt.

The separated soaps are now drawn off from the bottom, leaving the wax compound free from free acids but still carrying a certain amount of soaps.

The resultant wax-like material is then washed in a hot brine solution until the soaps are entirely removed, as may be determined by means of phenothalein indicator. The material is then washed to remove the salt.

The result is a wax-like substance formed from paraffin and beeswax, and preferably gum, wherein the materials are completely miscible and soluble in each other, and when melted, the substance forms a perfectly smooth, clear amber liquid without sediment of any kind. This assures the same properties and composition of the material upon application and obviates the possibility of clogging the spraying devices through the presence of solids. The product possesses a definite melting point around 125° Fahr., and it may be repeatedly melted and remelted without resulting in the separation of its components or varying its melting point. The entire mass melts uniformly at its definite melting point, and therefore may also be brushed or sprayed on a wound in a homogeneous form.

The product possesses greater strength and flexibility than paraffin alone, adheres better to the flesh, but is non-irritating and the coating is removed from the wound without tearing or disturbing the surface of the latter. The coating will not crack and admit air and its contact with the affected surface is soft and soothing. When removed from the wound, substantially no odor is noticeable.

The gum is added to obtain an added softness of contact with the flesh surfaces to which the coating is applied and prevents the coating adhering to hair. For use on hairless surfaces, the gum may be omitted, but for general use, I prefer to include the gum in the product.

A very advantageous feature of my improved dressing is the facility with which it lends itself as a vehicle for the application of medicinal drugs to a wound. Thus such drugs as eucalyptus oil, beta-naphthol, resorcin and picric acid may be added to the molten product and are held in solution as the product is applied to the wound by brushing or spraying. I believe my product to be the first to be usable as a vehicle for picric acid, and in the case of other drugs merely a mechanical mixture with other dressings have been possible. Where a mechanical mixture, instead of a true solution is obtained, the drug is of course unevenly intermingled with the body of the molten dressing, and not only interferes with the spraying of the dressing on the wound but results in an improper and uneven distribution of the drug. Owing to this advantageous feature of my improved dressing I am able to combine the desired drugs with my compound at the factory, being assured that when the dressing is melted and applied to the wound, the drugs will be evenly and uniformly distributed throughout the protective coating.

What I desire to claim is:—

1. A surgical dressing of a composition of paraffin and the esters and hydrocarbons of beeswax in proportions to obtain a definite melting point for the compound of from 120 degrees to 140 degrees Fahr., the ingredients being miscible with and soluble in each other to a degree to make them inseparable when melted at said temperatures, being substantially free from all free acids and extraneous material, and capable, when melted and applied to the body, of forming an elastic, non-cracking and non-irritating covering.

2. A surgical dressing of a composition of paraffin and the esters and hydrocarbons of beeswax in substantially the proportions of from 95% to 65% paraffin and from 5% to 35% beeswax, having a definite melting point from 120 degrees to 140 degrees Fahr., the ingredients being miscible with and soluble in each other to a degree to make them inseparable when melted at the said temperatures, being substantially free from all free acids and extraneous material, and capable, when melted and applied to the body, of forming an elastic, non-cracking and non-irritating covering.

3. A surgical dressing of a composition of paraffin, the esters and hydrocarbons of beeswax and a gum of the elemi group in proportions to obtain a definite melting point of from 120 degrees to 140 degrees Fahr., the ingredients being miscible with and soluble in each other to a degree to make them inseparable when melted at said temperatures, being substantially free from all free acids and extraneous material, and capable, when melted and applied to the body, of forming an elastic, non-cracking and non-irritating cover.

4. A surgical dressing of a composition of paraffin, the esters and hydrocarbons of beeswax and a gum of the elemi group in substantially the proportions of from 95% to 65% paraffin, from 5% to 35% beeswax and from $\frac{1}{10}$% to 5% gum, having a definite melting point from 120 degrees to 140 degrees Fahr., the ingredients being miscible with and soluble in each other to a degree to make them inseparable when melted at said temperatures, being substantially free from all free acids and extraneous material, and capable, when melted and applied to the body, of forming an elastic, non-cracking and non-irritating covering.

Signed at Pittsburgh, Penna., this 20th day of September, 1917.

KARL J. HOLLIDAY.